United States Patent
Mathur et al.

(10) Patent No.: US 11,431,733 B2
(45) Date of Patent: Aug. 30, 2022

(54) DEFENSE SYSTEM AND METHOD AGAINST CYBER-PHYSICAL ATTACKS

(71) Applicant: Singapore University of Technology and Design, Singapore (SG)

(72) Inventors: Aditya Mathur, Singapore (SG); Sridhar Adepu, Singapore (SG); Siddhant Shrivastava, Singapore (SG); Myat Aung Kaung, Singapore (SG); Nils Tippenhauer, Singapore (SG); Giedre Sabaliauskaite, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 786 days.

(21) Appl. No.: 16/331,409

(22) PCT Filed: Sep. 6, 2017

(86) PCT No.: PCT/SG2017/050444
§ 371 (c)(1),
(2) Date: Mar. 7, 2019

(87) PCT Pub. No.: WO2018/048351
PCT Pub. Date: Mar. 15, 2018

(65) Prior Publication Data
US 2019/0253440 A1    Aug. 15, 2019

(30) Foreign Application Priority Data

Sep. 7, 2016  (SG) .............................. 10201607439T

(51) Int. Cl.
*H04L 29/06*    (2006.01)
*G05B 19/05*    (2006.01)
(Continued)

(52) U.S. Cl.
CPC ...... *H04L 63/1416* (2013.01); *G05B 19/0428* (2013.01); *G05B 19/058* (2013.01);
(Continued)

(58) Field of Classification Search
CPC ............. H04L 63/1416; H04L 63/1425; H04L 63/1441; G05B 19/0428; G05B 19/058;
(Continued)

(56) References Cited

U.S. PATENT DOCUMENTS

| | | | |
|---|---|---|---|
| 9,064,110 B2 * | 6/2015 | Akiyama | ............... G06F 21/554 |
| 2014/0189860 A1 * | 7/2014 | Hull Roskos | ....... H04L 63/1408 726/22 |
| 2016/0234252 A1 * | 8/2016 | Carpenter | ........... H04L 63/1433 |

FOREIGN PATENT DOCUMENTS

| | | | | |
|---|---|---|---|---|
| EP | 2779569 A1 * | 9/2014 | ......... | H04L 63/1425 |
| EP | 2779569 A1 | 9/2014 | | |

(Continued)

OTHER PUBLICATIONS

Sharon Weinberger. Computer security: Is this the start of cyberwarfare? Nature, 174:142-145, Jun. 2011.
(Continued)

*Primary Examiner* — Kambiz Zand
*Assistant Examiner* — Afaq Ali

(57) ABSTRACT

The present disclosure generally relates to a system and method for defending a utilities system against cyber-physical attacks associated with anomalies in a physical process operative in the utilities system. The defense system comprises: a set of sensors for collecting physical data associated with the physical process; a set of controller devices for monitoring process states of the physical process based on the physical data from the sensors; a set of verification devices for monitoring the physical process based on the physical data from the sensors, the physical data enabling
(Continued)

the verification devices to detect the anomalies based on a set of invariants predefined for the physical process; and a set of actuators controllable by the controller devices or verification devices to remedy the anomalies and regulate the physical process, thereby defending the utilities system against the cyber-physical attacks.

20 Claims, 9 Drawing Sheets

(51) Int. Cl.
  *H04L 9/40* (2022.01)
  *G06F 21/55* (2013.01)
  *G05B 19/418* (2006.01)
  *G05B 19/042* (2006.01)

(52) U.S. Cl.
  CPC ......... *G05B 19/4184* (2013.01); *G06F 21/55* (2013.01); *G06F 21/554* (2013.01); *H04L 63/1425* (2013.01); *H04L 63/1441* (2013.01); *G05B 2219/14006* (2013.01); *G05B 2219/45103* (2013.01)

(58) Field of Classification Search
  CPC ...... G05B 19/4184; G05B 2219/14006; G05B 2219/45103; G06F 21/55; G06F 21/554
  See application file for complete search history.

(56) References Cited

FOREIGN PATENT DOCUMENTS

| KR | 20110097269 | A | * | 8/2011 | |
| WO | 2014109645 | A1 | | 7/2014 | |
| WO | 2015104691 | A2 | | 7/2015 | |
| WO | WO-2015104691 | A2 | * | 7/2015 | ........... G06F 21/552 |
| WO | 2018048351 | A1 | | 3/2018 | |

OTHER PUBLICATIONS

SWaT: Secure Water Treatment Testbed, 2015. https://itrust.sutd.edu.sg/wp-content/uploads/sites/3/2015/11/Brief-Introduction-to-SWaT_181115.pdf.
A. A. Cárdenas, S. Amin, Z.-S. Lin, Y.-L. Huang, C.-Y. Huang, and S. Sastry. Attacks against process control systems: Risk assessment, detection, and response. In ACM Symp. Inf. Comput. Commun. Security, 2011.
S. Adepu and A. Mathur. An investigation into the response of a water treatment system to cyber attacks. In Proceedings of the 17th IEEE High Assurance Systems Engineering Symposium, Orlando, Jan. 2016.
B. Zhu, A. Joseph, and S. Sastry. A taxonomy of cyber attacks on SCADA systems. In Internet of Things (iThings/CPSCom), International Conference on and 4th International Conference on Cyber, Physical and Social Computing, pp. 380-388, 2011.
D. Hadžiosmanović, R. Sommer, E. Zambon, and Pieter H. Hartel. Through the eye of the PLC: Semantic security monitoring for industrial processes. In Proceedings of the 30th Annual Computer Security Applications Conference, pp. 126-135, New York, NY, USA, 2014. ACM.
S. Amin, X. Litrico, S. S. Sastry, and A. M. Bayen, "Stealthy Deception Attacks on Water SCADA Systems," Proc. 13th ACM Int. Conf. on Hybrid Syst.: Computation and Control (HSCC 10), 2010, pp. 161-170, doi:10.1145/1755952.1755976.
A. A. Cardenas, S. M. I. Amin, and S. S. Sastry, "Secure Control: Towards Survivable Cyber-Physical Systems," Proc. 28th Int. Conf. on Distributed Computing Syst. Workshops (ICDCS 08), Jun. 2008, pp. 495-500, doi: 10.1109/ICDCS.Workshops.2008.40.
S. Kamouskos, "Stuxnet Worm Impact on Industrial Cyber-Physical System Security," Proc. 37th Annu. Conf. on IEEE Ind. Electronics Soc. (IECON 11), Nov. 2011, pp. 4490-4494, doi: 10.1109/IECON.2011.6120048.
R. Moghe, A. Iyer, F. C. Lambert, and D. Divan, "A Robust Smart Sensor for Smart Substations," Proc. IEEE Power and Energy Society General Meeting, Jul. 2012, pp. 1-8, doi: 10.1109/PESGM.2012.6345149.
K. Stouffer, J. Falco and K. Scarfone, "Guide to Industrial Control Systems (ICS) Security (SP 800-82)," NICT, Jun. 2011.
E. K. Wang, Y.-M. Ye, X.-F. F. Xu, S.-M. M. Yiu, L. C. K. Hui, and K.-P.P. Chou, "Security Issues and Challenges for Cyber-Physical System," Proc. IEEE/ACM Int. Conf. on Green Computing and Commun. (GreenCom 10) and Int. Conf. on Cyber, Physical and Social Computing (CPSCom 10), Dec. 2010, pp. 733-738, doi: 10.1109/GreenCom-CPSCom.2010.36.
Q. Zhu, C. G. Rieger, and T. Baar, "A Hierarchical Security Architecture for Cyber-Physical Systems," Proc. 4th Int. Symp. on Resilient Control Syst. (ISRCS 11), Aug. 2011, pp. 15-20, doi: 10.1109/ISRCS.2011.6016081.
W. Wolf. "Cyber-Physical Systems," IEEE Computer, vol. 42, No. 3, pp. 88-89, Mar. 2009, doi: 10.1109/MC.2009.81.
P. M. Frank, "Fault Diagnosis in Dynamic Systems Using Analytical and Knowledge-Based Redundancy: a Survey and Some New Results", Automatica, vol. 26, No. 3, pp. 459-474, May 1990, doi: 10.1016/0005-1098(90)90018-D.
A. Teixeira, D. Pérez, H. Sandberg, and K. H. Johansson, "Attack Models and Scenarios for Networked Control Systems", Proc. 1st Int. Conf. on High Confidence Networked Syst. (HiCoNS 12), 2012, pp. 55-64, doi: 10.1145/2185505.2185515.
Y. Mo, B. Sinopoli, "Secure Control Against Replay Attacks", Proc. 47th Annual Allerton Conf. on Commun., Control, and Computing, Sep. 2009, pp. 911-918, doi: 10.1109/ALLERTON.2009.5394956.
Y. Mo and B. Sinopoli, "False Data Injection Attacks in Control Systems", Proc. 1st Workshop on Secure Control Syst., CPS Week, Apr. 2010.
L. Ma, T. Yuan, F. Xia, M. Xu, J. Yao, and M. Shao, "A High-Confidence Cyber-Physical Alarm System: Design and Implementation", Proc. IEEE/ACM Int. Conf. on Green Computing and Commun. (GreenCom 10) and Int. Conf. on Cyber, Physical and Social Computing (CPSCom 10), Dec. 2010, pp. 516-520, doi: 10.1109/GreenCom-CPSCom.2010.75.
J. Chen and A. Abur, "Placement of PMUs to Enable Bad Data Detection in State Estimation", IEEE Trans. on Power Syst., vol. 21, No. 4, Nov. 2006, pp. 1608-1615, doi: 10.1109/TPWRS.2006.881149.
Foreign Communication from a Related Counterpart Application, International Search Report and Written Opinion dated Nov. 3, 2017, International Application No. PCT/SG2017/050444 filed on Sep. 6, 2017.
Sabaliauskaite G. et al., Design of Intelligent Checkers to Enhance the Security and Safety of Cyber Physical Systems. IEEE 38th Annual International Computers, Software and Applications Conference Workshops, Jul. 25, 2014, pp. 7-12. [Retrieved on Oct. 11, 2017] <DOI: 10.1109/COMPSACW.2014.128>.

* cited by examiner

| Model element | Description |
|---|---|
| $x_{k+1} = Ax_k + Bu_k$ | $x_k$ and $u_k$, respectively, denote the state and input vectors in SWaT at time step $k$. $A$ and $B$ are matrices of constants. |
| $y_{k+1} = Cx_k + D\eta_k$ | $y_{k+1}$ is a vector of sensor readings at step $k+1$ received by a PLC; $C$ and $D$ are constant matrices; $\eta$ denotes sensor noise vector under normal system operation. $y_{k+1} = y'_k$ when the system is under attack ; $y'_k$ is the data sent by an attacker to the PLC and depends on the type of attack.[3] |
| $L^i_{k+1} = a_i L^i_k + b_i(f^{i,in}_k - f^{i,out}_k)$ | Water level in tank $i$ at step $k+1$. $f^{i,in}_k$ and $f^{i,out}_k$ denote, respectively, flow of water into and out of tank $i$, $1 \leq i \leq 5$. $a_i$ and $b_i$ are proportionality constants. |
| $\tilde{x}(k+1) = y(k) + \alpha(f^{i,in}_k - f^{i,out}_k)$ | Estimating the system state $\tilde{x}$. $\alpha$ is the flow rate to water level conversion factor. |
| $\dfrac{\sum_{i=1}^{n}(\tilde{x}(i) - y(i))}{n} > \epsilon$ | When true, this condition (an invariant) implies an attack, or a component failure. $\epsilon$ and $n$ are attack detection parameters determined experimentally. In the experiments reported here, $n = 10$ and $\epsilon = 0.55$. |

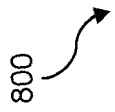

Figure 8

| Region 1 | | |
|---|---|---|
| Element type | Label | Function |
| Logical: Data | LIT101 | Senses water level in tank T101 in stage 1. |
| Logical: Data | P101 | Pump to move water from tank T101 to tank T301 via a chemical dosing station. |
| Logical: Code | PLC 1 | Code in PLC 1 to control stage. |
| Physical | MV101 | Motorized valve that when opened allows the flow of water from an external source into tank T101. |
| Region 2 | | |
| Logical: Data | DPIT301 | Differential pressure sensor across the Ultrafiltration unit. |
| Logical: Data | LIT301 | Senses water level in tank T301 in stage 3. |
| Physical | Ultrafiltration unit | Membrane based unit to remove small particles from incoming water. |

Figure 9

DEFENSE SYSTEM AND METHOD AGAINST CYBER-PHYSICAL ATTACKS

CROSS REFERENCE TO RELATED APPLICATION(S)

The present application is a filing under 35 U.S.C. 371 as the National Stage of International Application No. PCT/SG2017/050444, filed Sep. 6, 2017, entitled "DEFENSE SYSTEM AND METHOD AGAINST CYBER-PHYSICAL ATTACKS," which claims the benefit of Singapore Patent Application No. 10201607439T filed on 7 Sep. 2016 with the Intellectual Property Office of Singapore, both of which are incorporated herein by reference in their entirety for all purposes.

TECHNICAL FIELD

The present disclosure generally relates to a defense system and method against cyber-physical attacks. More particularly, the present disclosure describes various embodiments of a defense system and method for defending a utilities system against cyber-physical attacks.

BACKGROUND

Utilities systems or public utilities, such as power generation plants, water treatment plants, transportation infrastructure, supply chains, electrical power grids, medical facilities, and smart buildings, are often at risk of cyber-physical attacks or malicious cyber-physical activity. A utilities system comprises a physical subsystem that is controlled by a cyber subsystem. A cyber-physical attack on the utilities system refers to an attempt to disrupt the operation of the physical system through the manipulation of cyber and/or physical components of the utilities system. The utilities system may also be referred to as a Cyber Physical System (CPS) or Industrial Control System (ICS). The physical subsystem comprises components such as generators, transformers, pumps, and tanks, for operating physical processes in the utilities system. The cyber subsystem comprises networked embedded computation and communication devices, e.g. programmable logic controllers (PLCs) and a Supervisory Control and Data Acquisition (SCADA) system/workstation, as well as sensors and actuators for monitoring, measure, and control of the physical processes.

The cyber subsystem of a utilities system may comprise one or more control stages, each control stage for controlling one physical process. The control actions by the PLCs are based on the current process state obtained through the sensors, and the control actions subsequently alter the process state. For example, in a water treatment plant, the PLCs may communicate instructions to an actuator, e.g. a pump, to fill a tank with water. The pump is instructed to stop when the tank reaches a predetermined level. Physical data for the water level in the tank is communicated to the PLCs through a level sensor. Thus, the PLCs receive physical data from the sensors, compute control actions, and apply these actions to the actuators.

The communications infrastructure of a utilities system, often using wired and/or wireless communications, may be connected to an external network. However, such connections render the utilities system susceptible to cyber attacks. Such attacks may compromise the communication links between sensors, actuators, and the PLCs, as well as across the PLCs and SCADA system. Each such link is considered as an attack point in the utilities system. Once a link has been compromised, an attacker can send fake or false state (sensor) data to the PLCs, or bypass the PLCs and directly control the actuators. Unless the defense system of the utilities system is robust, such attacks are able to cause an undesirable response that may lead to system shutdown and/or component damage. Furthermore, it is assumed that an attacker has access to any one or more control stages of the utilities system. Thus, the attacker is able to compromise components in one or more control stages to which access is available. In many complex utilities systems, the PLCs are often distributed. Although attacking more than one control stage simultaneously might be difficult, it is known to be feasible.

Many existing cyber-physical attack detection solutions for utilities systems are extensions of the traditional network-centric defense system or infrastructure such as firewalls and other network-based logic to prevent intrusions into a utilities system. Such solutions are aimed at preventing unauthorized access into the utilities system. However, social engineering and software vulnerabilities may still enable an attacker to obtain access to the utilities system, potentially leading to component damage and significant deviation from desired behaviour of the physical processes operative in the utilities system.

Assuming that an attacker has bypassed the traditional network-centric defense system, a variety of attacks can be launched in such a situation. While some attacks may focus only on a few components of the utilities system, others may compromise the entire utilities system. For example, bypassing the traditional network-centric defense system exposes the PLCs to the attacker, potentially compromising the logics of the PLCs. This may result in the PLCs computing false/fake sensor data that affect performance of the physical processes. For example, the PLCs may be led by the attacker to believe that a physical process is operating normally, when in fact the physical process is behaving anomalously. The actuators may also be directly controlled by the attacker to behave anomalously and affect performance of the physical process.

Flaws in the design of the cyber subsystem thus expose the utilities system to cyber-physical attacks that may damage its components and/or affect performance of the physical processes. Utilities systems generally operate in real-time, and must be safe, secure, and efficient. As attackers become more skilled in planning and executing cyber-physical attacks, utilities systems continue to be vulnerable to cyber-physical attacks, and such risks and vulnerabilities cannot be undermined or neglected. One of the most dangerous cyber attacks on utilities systems or critical infrastructures is the Stuxnet worm attack. Such cyber attacks may cause devastating consequences and are difficult to detect.

In various utilities systems, there are many possible types of cyber-physical attacks that lead to undesirable or anomalous behaviour and performance of physical processes operative in the utilities systems. One type of cyber attacks is a man-in-the-middle attack to maliciously manipulate sensor data and/or status of the actuators. For example in a water treatment plant, the intention of such an attack may be to cause a tank to overflow or a reduction in the performance measured as gallons of water produced per minute. Other types of cyber attacks or attack vectors include, but are not limited to, ma are injection into the PLCs, Denial of Service (DOS) or Distributed DOS (DDOS).

Therefore, in order to address or alleviate at least one of the aforementioned problems and/or disadvantages, there is a need to provide a defense system and method against cyber-physical attacks, in which there is at least one improvement and/or advantage over the prior art.

SUMMARY

According to a first aspect of the present disclosure, there is a defense system for defending a utilities system against cyber-physical attacks associated with anomalies in a physical process operative in the utilities system. The defense system comprises: a set of sensors for collecting physical data associated with the physical process; a set of controller devices for monitoring process states of the physical process based on the physical data from the sensors; a set of verification devices for monitoring the physical process based on the physical data from the sensors, the physical data enabling the verification devices to detect the anomalies based on a set of invariants predefined for the physical process; and a set of actuators controllable by the controller devices or verification devices to remedy the anomalies and regulate the physical process, thereby defending the utilities system against the cyber-physical attacks.

According to a second aspect of the present disclosure, there is a defense method for defending a utilities system against cyber-physical attacks associated with anomalies in a physical process operative in the utilities system. The defense method comprises: collecting, by a set of sensors, physical data associated with the physical process; monitoring, by a set of controller devices, process states of the physical process based on the physical data from the sensors; monitoring, by a set of verification devices, the physical process based on the physical data from the sensors, the physical data enabling the verification devices to detect the anomalies based on a set of invariants predefined for the physical process; detecting, by the verification devices, the anomalies in the physical process; and controlling, by the controller devices or verification devices, a set of actuators to remedy the anomalies and regulate the physical process, thereby defending the utilities system against the cyber-physical attacks.

An advantage of the present disclosure is that the defense system can be used to defend the utilities system from cyber-physical attacks such as in situations where the communications network and/or the control logic inside the controller devices are compromised. The defense system uses an orthogonal defense that is separate/independent from the traditional defense system, e.g. network firewalls, of the utilities system. The defense system uses verification devices that are able to detect cyber attacks based on the use of invariants derived from process dynamics and interactions among components across the physical processes operative in the utilities system. The design of the defense system 300 is not influenced by any specific attacker model or attack model, and is thus able to detect unique and undocumented attacks, also known as zero day attacks, when they cause anomalies that involve deviation of dynamics of the physical processes from the expected behaviour.

A defense system and method against cyber-physical attacks according to the present disclosure are thus disclosed herein. Various features, aspects, and advantages of the present disclosure will become more apparent from the following detailed description of the embodiments of the present disclosure, by way of non-limiting examples only, along with the accompanying drawings.

BRIEF DESCRIPTION OF THE DRAWINGS

FIG. 8 is an illustration of a table of sample model equations used to derive invariants, in accordance with various embodiments of the present disclosure.

FIG. 9 is an illustration of a table of sample attack regions in a utilities system (water treatment plant), in accordance with various embodiments of the present disclosure.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated. As used herein, the term "set" corresponds to or is defined as a non-empty finite organization of elements that mathematically exhibits a cardinality of at least one (e.g. a set as defined herein can correspond to a unit, singlet, or single element set, or a multiple element set), in accordance with known mathematical definitions. The recitation of a particular numerical value or value range herein is understood to include or be a recitation of an approximate numerical value or value range.

For purposes of brevity and clarity, descriptions of embodiments of the present disclosure are directed to a defense system and method against cyber-physical attacks, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

Utilities System

Figure 1:
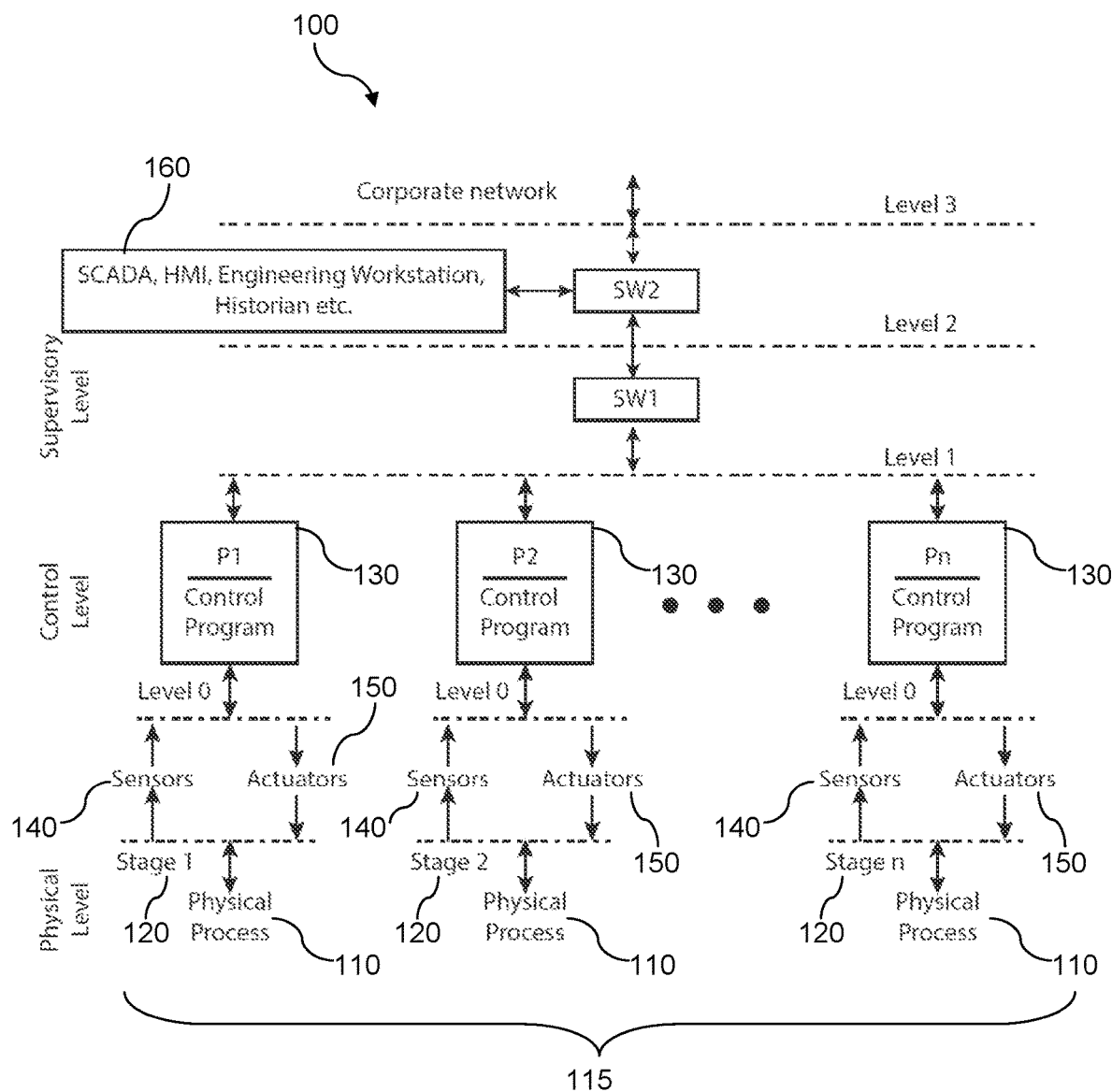
FIG. 1 is an illustration of an architecture schematic of a cyber subsystem 100 of a utilities system, in accordance with various embodiments of the present disclosure.

Representative or exemplary embodiments of the present disclosure describe a defense system and method for defending a utilities system against cyber attacks and/or physical attacks (collectively referred to as cyber-physical attacks). FIG. 1 illustrates an architecture schematic of a control or cyber subsystem 100 of the utilities system for controlling a physical subsystem (not shown) of the utilities system. Particularly, the cyber subsystem 100 controls physical processes 110 operative or performed in the utilities system. The physical processes 110 are affected by cyber-physical attacks in the utilities system, causing anomalies or abnormalities in the physical processes 110. The cyber-physical attacks are thus associated with anomalies/abnormalities in the physical processes 110. Each physical process 110 may be considered as a process stage of a collective physical process 115. Each physical process or process stage 110 is controlled by a corresponding control stage 120 of the cyber subsystem 100.

The cyber subsystem 100 comprises various components/devices for monitoring, including measuring and controlling, the physical processes 110. The cyber subsystem 100 comprises one or more sets of controller devices 130 for monitoring process states of the physical processes 110 based on analysis of physical data associated with the physical processes 110. Each controller device 130 may comprises a programmable logic controller (PLC). It will be appreciated that the PLCs are generally programmable in a variety of suitable programming languages such as ladder logic, structured text, and functional blocks. Each controller device 130 may additionally or alternatively comprise a remote terminal unit (RTU).

The cyber subsystem 100 comprises one or more sets of sensors 140 for collecting the physical data and communicating it to the controller devices 130. The cyber subsystem 100 comprises one or more sets of actuators 150 controllable by the controller devices 130 to execute actions computed/determined by the controller devices 130. The cyber subsystem 100 comprises a set of supervisory devices 160 including but not limited to SCADA workstation, Human Machine Interface (HMI), engineering workstation, Historian, and OPC (Object linking and embedding for Process Control) server. The SCADA workstation and HMI are communicatively connected to all the controller devices 130 across all control stages 120 for overall monitoring and control of all physical processes/process stages 110 of the collective physical process 115. The SCADA workstation and HMI may also be referred to as the control or command centre of the cyber subsystem 100.

In one embodiment, the collective physical process 115 is a water treatment process segmented into six physical processes/process stages 110—raw water input, chemical dosing, ultrafiltration, dichlorination, reverse osmosis, and backwash. Each physical process 110 is controlled by a corresponding control stage 120, and each control stage 120 comprises its own sets of controller devices 130, sensors 140, and actuators 150. Each physical process 110 is thus associated with the corresponding sets of controller devices 130, sensors 140, and actuators 150. For example, in a physical process 110 for raw water input, various physical components are used, such as a pump, water tank, and valve. The controller devices 130 rely on the sensors 140 to obtain physical data for process state estimation and control the actuators 150, e.g. the pump or valve, to control the physical process 110, i.e. input flow rate of the water. The placement of the sensors 140 in the utilities system would depend on the functional and cyber security requirements of the collective physical process 115 operative therein.

As illustrated in FIG. 1, the cyber subsystem 100 is structured hierarchically into several levels/layers of communication networks. Communications within and across the various levels occur via known wired/wireless communication protocols as well as other computational or network devices such as network switches and communications interfaces, as will be readily known to the skilled person. The lowest level (Physical Level) comprises the physical subsystem wherein the physical processes 110 are performed. The next level (Level 0 or Control Level) comprises a communication network that allows the controller devices 130 to communicate with the sensors 140 and actuators 150 to control the physical processes 110 and implement anomaly detection and process regulatory mechanisms. The next level (Level 1 or Control Level) comprises a communication network that allows the controller devices 130 to communicate with one another, enabling access to state information such as water level in a tank, or pH value of water at a particular physical process 110. The next level (Level 2 or Supervisory Level) comprises diagnostics tools combined with optimal control based tools to provide precise assessment of the situation and ensure timely response to cyber-physical attacks and/or component failures. Communications between the controller devices 130 and the supervisory devices 160, e.g. SCADA workstation, occur via network switch SW1. The supervisory devices 160 collect information from all controller devices 130 across all control stages 120 and for all physical processes 110 operative in the utilities system. The highest level (Level 3 or Management Level) comprises a corporate network where the decision makers focus on strategies to maximize profits and minimize losses of the utilities system due to security and reliability risks. Communications between the supervisory devices 160, e.g. SCADA workstation, and the corporate network occur via network switch SW2.

Figure 2:
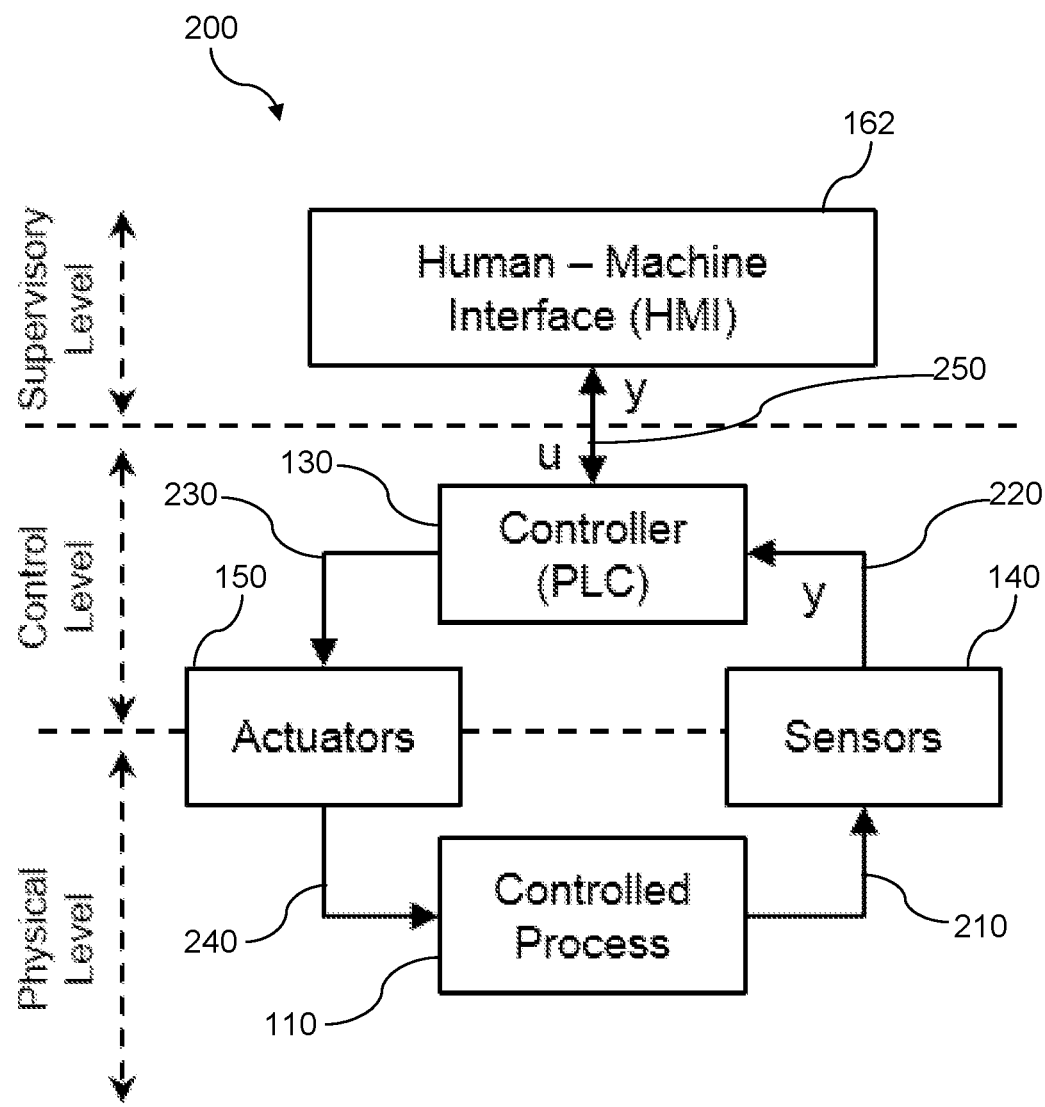
FIG. 2 is an illustration of a control workflow of a physical process operative in the utilities system, in accordance with various embodiments of the present disclosure.

The control of a physical process 110 operative in the utilities system can be described as a workflow 200 with reference to FIG. 2. For purpose of brevity, the workflow 200 is described based on one physical process 110. It will be appreciated that the workflow 200 is similarly applicable to other physical processes 110 of the collective physical process 115 operative in the utilities system, as distinct workflows or as part of an integrated workflow.

The workflow 200 comprises four main steps—monitoring step 210, networking step 220, computing step 230, and actuation step 240. In the monitoring step 210, the physical process 110 and environment are monitored by the use of the sensors 140. Particularly, measurements (indicated as y) of physical data of the physical process 110 collected by the sensors 140. In the networking step 220, the physical data collected by sensors is communicated to the controller devices 130. In the computing step 230, the physical data is analyzed and further actions are computed/determined by the controller devices 130. In the actuation step 240, the actuators 150 are controlled by the controller devices 130 to execute the computed/determined actions, thereby controlling the physical process 110. The steps 210, 220, 230, and 240 form a control loop between the controlled physical process 110, controller devices 130, sensors 140, and actuators 150.

Operators and/or engineers of the utilities system use a supervisory device (HMI 162) to monitor the physical subsystem under control of the cyber subsystem 100. Particularly, the sensor measurements y are communicated from the controller devices 130 to the control centre via the HMI 162 in a step 250 of the workflow 200. In addition, the control centre may be used to communicate the user input and/or feedback (indicated as u) provided by the operators/engineers to the controller devices 130. The user input/feedback may be instructions to configure set points, control algorithms, adjust parameters in the controller devices 130, and/or display current process status and historical information.

Orthogonal Defense

Figure 3:
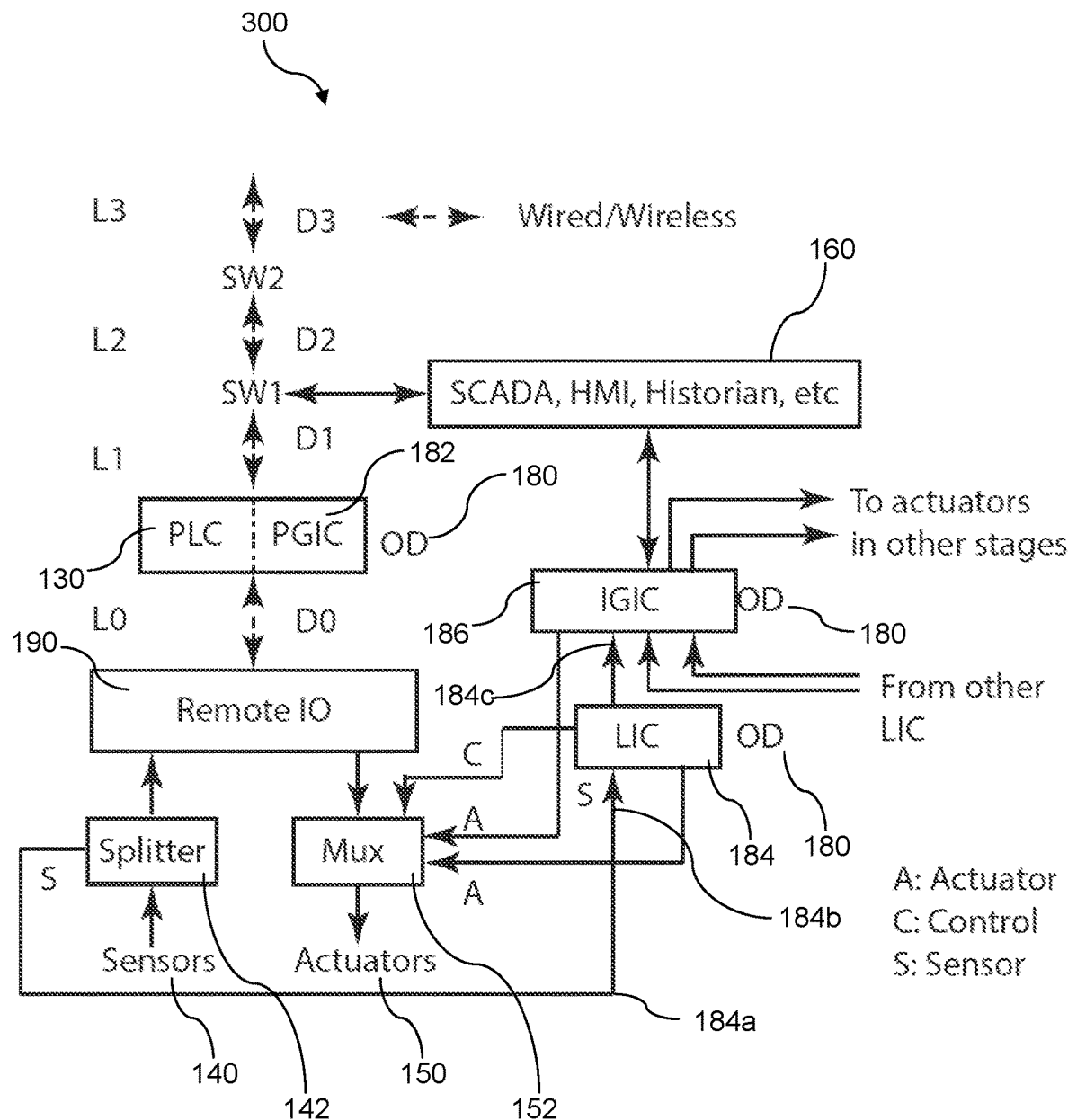
FIG. 3 is an illustration of an architecture schematic of a defense system 300 for defending a utilities system against cyber-physical attacks, in accordance with various embodiments of the present disclosure.

Various security approaches and/or defense systems/mechanisms can be implemented at individual or across several levels and/or control stages 120 for secure communication inside the cyber subsystem 100. In various embodiments of the present disclosure, there is a defense system 300 for a control stage 120 of the cyber subsystem 100, as schematically illustrated in FIG. 3. For purpose of brevity, the defense system 300 is described based on one control stage 120 for controlling one physical process 110. It will be appreciated that the defense system 300 is similarly applicable to other physical processes 110, as distinct defense systems or as part of an integrated defense system.

The defense system 300 comprises a traditional network-centric and layered defense infrastructure or system including network firewalls and other anomaly detection devices. The traditional defense system is indicated as D0, D1, D2, and D3, corresponding to the respective levels 0 to 3 (L0 to L3) of the cyber subsystem 100. The defense system 300 further comprises an Orthogonal Defense (OD) system that is separate/independent from, as well as is auxiliary to and complements, the traditional defense system. The OD system is also named or known as "Argus".

Figure 4:
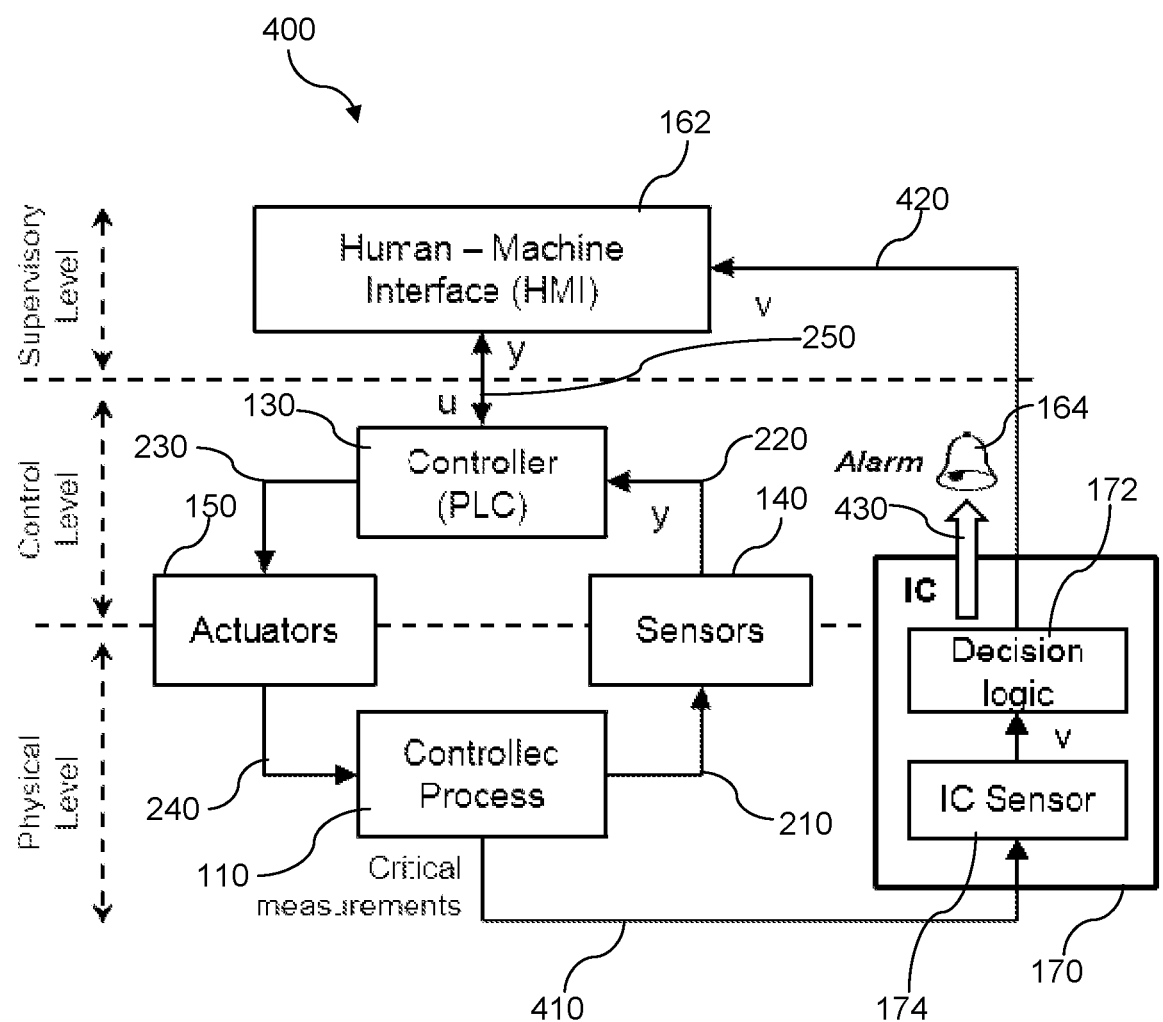
FIG. 4 is another illustration of a control workflow of a physical process operative in a utilities system, in accordance with various embodiments of the present disclosure.

The defense system 300 enables detection of cyber-physical attacks on the cyber subsystem 100. The detection of cyber-physical attacks is based on redundancy, namely physical and analytical redundancies. With further reference to FIG. 4, the OD system comprises various types of hardware devices known as Intelligent Checkers (ICs) 170. Each IC 170 is a monolithic device comprising a decision logic component or microprocessor 172, one or more IC sensors 174, a signal conditioner, and an analog-to-digital converter. The decision logic component 172 provides analytical redundancy and the IC sensor 174 provides physical redundancy in defending the cyber subsystem 100. In the case of physical redundancy, the IC sensor 174 measures parameters of the physical process 110, duplicating or emulating the functions of the sensors 140. Analytical redundancy makes use of a mathematical model implemented in an anomaly detection module of the decision logic component 172. The mathematical model may include one or more estimators/estimation algorithms, such as Kalman filtering or linear quadratic estimation. An estimator performs a comparison of actual measurements of physical data of the physical process 110 with predefined constraints or conditions.

FIG. 4 illustrates a workflow 400 for control of a physical process 110. For purpose of brevity, the workflow 400 is described based on one physical process 110 with one IC 170. It will be appreciated that the workflow 400 is similarly applicable to other physical processes 110 and with multiple ICs 170. It will also be appreciated that various steps of the workflow 200 are similar/analogous to various steps of the workflow 400.

The decision logic component 172 of the IC 170 is communicatively connected to one or more alert devices 164, e.g. an audible/visible alarm. The decision logic component 172 monitors the status of the physical process 110 via the IC sensor 174. In a step 410, measurements (indicated as v) of physical data of the physical process 110 are collected by the IC sensor 174. In a step 420, the measurements v are then periodically communicated to the control centre via the HMI 162. Operators also receive the measurements y (collected by the sensors 140) from controller devices 130, and can compare their values. In a step 430, the decision logic component 172 activates the alert devices 164 when the measurements v violate or deviate from the predefined constraints, and/or when the measurements v and y deviate from each other.

The predefined constraints are associated with critical properties of the physical process 110 known as invariants. Particularly, an invariant is defined based on one or more predefined constraints of the physical process 110 operative in the utilities system. Furthermore, the invariant may be defined based on one or more predefined constraints of other physical processes 110. The predefined constraints are conditions for one or more process variables whose values are sampled from the sensors 140. The predefined constraints are derived using fundamental laws of physics and/or chemistry that govern the interactions between various components of a utility of the physical process 110. The process variables depend on the nature of the physical process 110 and possibly of one or more other physical processes 110. The process variables may include parameters such as temperature, light, pressure, and humidity. A predefined constraint may also specify the maximum and minimum temperatures in a component of the utilities system, such as a boiler. In one example, in a water treatment plant and at a given time instant, a suitable set of invariants constitutes the observable state of the water treatment plant. The invariants may include the correlation between the water level in a tank and the incoming and outgoing flow rates across the tank.

The invariants are programmed and the resulting program code is embedded in the ICs 170. The coded invariants are checked at all times to ensure that the underlying physical processes 110 are behaving as desired. An invariant must be true when evaluated in a given state of the utilities system. When evaluated as false, the invariant leads to an alert indicating that a physical process 110 has diverged from its intended behaviour, i.e. there are one or more anomalies in the behaviour of the physical process 110. An alert may lead to a sequence of control actions, e.g. sounding an alarm and/or controlling the actuators 150, aimed at avoiding significant damage to the utilities system and/or reduction in performance of the physical process 110.

The ICs 170 are designed to respond quickly to changes in sensor measurements. However, these measurements can be affected by noise, such as from the measurements themselves, operation of the physical processes 110, and/or failures or malfunctions of the IC sensors 174. Sensitivity to noise and sensor failures may result in false alarms from the ICs 170. Noise may be taken into consideration during predefining of the constraints, so that the ICs 170 are able to tolerate a certain level of measurement noise to minimize occurrence of false alarms. It will be appreciated that detection of IC sensor failures will be readily known to the skilled person, such as with the supervisory devices 160 using analytical failure filters.

Accordingly, the ICs 170 are designed to improve the resilience of a utilities system, specifically the cyber subsystem 100, to cyber attacks by ensuring that any violation of or deviation from the invariants is detected and communicated to the operators via the HMI 162 soon after occurrence, enabling timely initiation of emergency procedures. As shown in FIG. 4, the measurements v are directly communicated to the HMI 162 and control centre without passing through the controller devices 130. Thus, any attack on the controller devices 130 will not compromise the IC 170: the IC 170 continues to alert operators of possible cyber attacks even if the controller devices 130 have been compromised. The SCADA workstation compares the measurements y (from the sensors 140) and measurements v (from the IC 170), and determine whether they corroborate each other. Inconsistencies in the measurements may indicate abnormal operation of the utilities system.

Therefore, the defense system 300 is thus able to verify/authenticate the physical data collected by the sensors 140 by validating/corroborating the physical data at the SCADA workstation. The defense system 300 provides a holistic view of the states of the physical process 110 and hence is able to defend and protect the utilities system from cyber-physical attacks.

Figure 5:
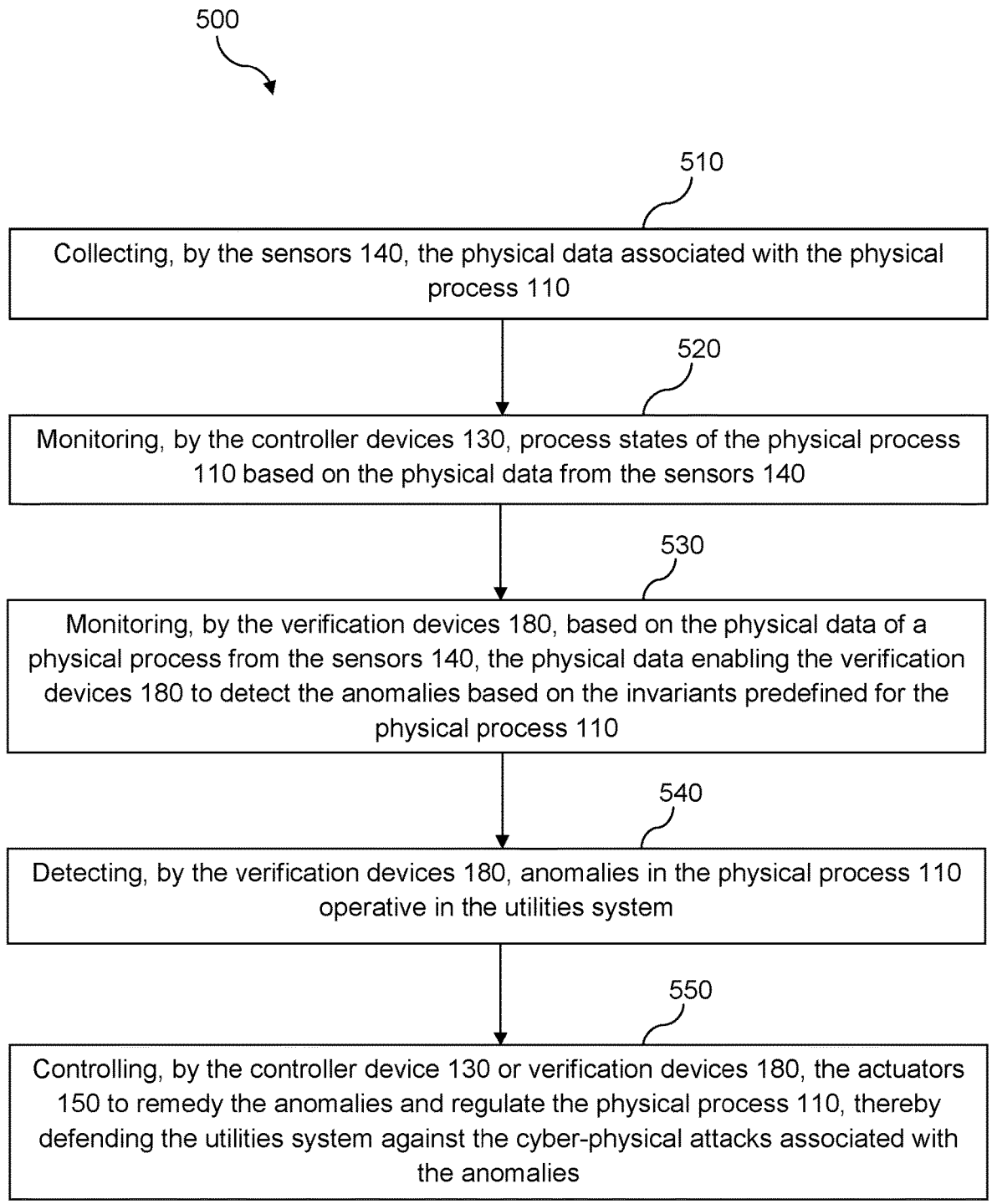
FIG. 5 is a flowchart illustration of a defense method for defending a utilities system against cyber-physical attacks, in accordance with various embodiments of the present disclosure.

In various embodiments of the present disclosure with reference to FIG. 5, there is a defense method 500 implemented in the defense system 300, the method 500 for defending a utilities system against cyber-physical attacks, the cyber-physical attacks associated with anomalies in a physical process 110 operative or performed in the utilities system. The anomalies may relate to abnormalities in the operation or performance of the physical process 110, and/or violations/deviations of physical data of the physical process 110 from the invariants. For purpose of brevity, the method 500 is described based on one physical process 110, but it will be appreciated that the method 500 is similarly applicable to other physical processes 110.

The method 500 comprises a step 510 of collecting, by the sensors 140, the physical data associated with the physical process 110. The method 520 comprises a step 520 of monitoring, by the controller devices 130, process states of the physical process 110 based on the physical data from the sensors 140. Particularly, the controller devices 130 monitor and control the physical process 110 by altering the physical process 110 such that the physical data follows an intended behaviour.

Referring to FIG. 3, the cyber subsystem 100 comprises one or more sets of verification devices 180 for monitoring the physical processes 110 based on the physical data associated with the physical processes 110. The method 500 comprises a step 530 of monitoring, by the verification devices 180, based on the physical data of a physical process from the sensors 140, the physical data enabling the verification devices 180 to detect the anomalies based on the invariants predefined for the physical process 110.

The verification devices 180 are designed to be behaviourally and structurally independent of the portion of the cyber subsystem 100 comprising the controller devices 130, sensors 140, and actuators 150. Each verification device 180 is an OD element that provides an additional layer of defense to the utilities system, separated and independent from the traditional defense system. Each verification device 180 comprises an IC 170 that enables the detection of cyber attacks on the cyber subsystem 100. The verification devices 180 provide an advantage of enabling the cyber subsystem 100 to compare the physical data from the controller devices 130 and verification devices 180, and determine whether they corroborate each other.

In some embodiments, the verification devices 180 comprise a number of global verification devices 182 programmatically integrated with or is resident in the controller devices 130 which may comprise PLCs. Each global verification device 182 comprises one or more ICs 170 for detecting the anomalies. The global verification devices 182 may also be referred to as PLC-resident Global Intelligent Checkers (PGICs), and may be built or implemented using a Linux-based computer or server. For purpose of brevity and as shown in FIG. 3, there is one global verification device 182 resident in one controller device 130 for monitoring the physical process 110.

The global verification device 182 is communicatively connected to the sensors 140 to receive the physical data collected by the sensors 140. Particularly, the global verification device 182 detect whether the physical data matches the dynamics of the physical process 110 based on the invariants predefined for the physical process 110. The control logic of the global verification device 182 is executed at all times together with the PLC control logic of the controller device 130. The SCADA workstation compares the physical data from the controller device 130 and global verification device 182, and determine whether they corroborate each other. Inconsistencies in the physical data are associated with the anomalies in the physical process 110.

The controller device 130 in one control stage 120 for a physical process 110 may be communicatively connected to other controller devices 130 associated with other control stages 120 and other physical processes 110 of the collective physical process 115 operative in the utilities system. This enables the controller device 130 to learn the process states of the other physical processes 110 and of the collective physical process 115. As each controller device 130 has a global verification device 182 resident therein, the global verification device 182 in one control stage 120 is able to obtain physical data collected by other sensors 140 for the other physical processes 110.

In an attack event where all sensors 140 in one control stage 120 are compromised, the attack cannot be detected by the global verification device 182 in the control stage 120. However, the global verification device 182 in another control stage 120, e.g. a neighbouring, preceding, or succeeding control stage 120, may be able to detect the attack as the sensors 140 in the other control stage 120 have not been compromised. Such detection is possible due to the process interactions across the control stages 120.

In some embodiments, the verification devices 180 comprise a number of local verification devices 184 communicatively isolated from the controller devices 130. Each local verification device 184 comprises one or more ICs 170 for detecting the anomalies. The local verification devices 184 may also be referred to as Local Intelligent Checker (LICs), and may be built or implemented using a computer such as Raspberry Pi® which is a minicomputer. For purpose of brevity and as shown in FIG. 3, there is one local verification device 184 for monitoring the physical process 110.

The local verification device 184 is communicatively connected to the sensors 140 to receive the physical data collected by the sensors 140. Particularly, the local verification device 184 detect whether the physical data matches the dynamics of the physical process 110 based on the invariants predefined for the physical process 110. The SCALA workstation compares the physical data from the controller device 130 and local verification device 184, and determine whether they corroborate each other. Inconsistencies in the physical data are associated with the anomalies in the physical process 110.

The local verification device 184 performs both detection of the anomalies and control of the physical process 110. The local verification device 184 obtains physical data directly from the sensors 140 and can command the actuators 150. An attack on the controller device 130 is likely to affect a global verification device 182 resident in the controller device 130, but is unlikely to affect the local verification device 184 as the local verification device 184 is communicatively isolated from the controller device 130. Thus, the local verification device 184 may provide for better corroboration of the physical data for detecting the anomalies. The local verification device 184 is designed to prevent damage to components of the utilities system at a specific control stage 120 (controlling the physical process 110) or across multiple control stages 120 (controlling multiple physical processes 110).

The physical data is obtained by the local verification device 184 from the sensors 140 using a secure mechanism, such as by using redundant sensors connected directly to the local verification devices 182 or by using a splitter 142 at each sensor 140. As shown in FIG. 3, the sensors 140 are connected to the splitter 142 that splits the output from the sensors 140 into two (or more) identical signals carrying the physical data. One signal is communicated to the controller device 130 and the other signal is communicated to the local verification device 184.

Thus, the physical data is communicated from the sensors 140 via the splitter 142 to the controller device 130 and local verification device 184 separately. Specifically, the physical data is communicated from the sensors 140 to the controller device 130 via a communication network, such as or including a remote input/output interface 190. In addition, the physical data (indicated as S) is communicated from the sensors 140 directly to the local verification device 184 via a wired communication 184a (e.g. hardwire) without going through the controller device 130.

The local verification device 184 comprises only one communication input 184b for receiving the physical data via the wired communication 184a. The wired communication 182a reduces the chances of a man-in-the-middle attack (cyber attack) on the sensors 140 which can compromise the communication connection between the sensors 140 and the local verification device 184. The wired communication 184a thus mitigates risk of remote intrusion, e.g. hacking, into the cyber subsystem 100 to tamper with the local verification device 184, as well as risk of deception (e.g. false physical data/sensor measurements) to the local verification device 184, unless the wired communication 184a is physically tampered with (physical attack). Accordingly, the local verification device 184 is inaccessible to an attacker via the normal communication network used by the cyber subsystem 100, and can be attacked only through physical means.

Other than the communication input 184b, the local verification device 184 has no other communication input or incoming network links. This prevents the controller device 130 from communicating with the local verification device 184, thereby mitigating risk of further compromising the local verification device 184 if the controller device 130 has already been compromised. The controller device 130 and local verification device 184 are thus communicatively isolated from each other and this "one-way communication" enforces the security of the defense system 300. An attempt to communicate from the controller device 130 to the local verification device 184 would be flagged off as malicious activity. The local verification device 184 is configured to detect as an anomaly in response to the local verification device 184 detecting an input communication attempt from the controller device 130.

In some embodiments, the verification devices 180 comprise a number of independent global verification devices 186 communicatively connected to the local verification devices 184 and similarly communicatively isolated from the controller devices 130. Each independent global verification device 186 comprises one or more ICs 170 for detecting the anomalies. The independent global verification devices 186 may also be referred to as Independent Global Intelligent Checker (IGICs), and may be built or implemented using a computer such as Raspberry Pi. For purpose of brevity and as shown in FIG. 3, there is one independent global verification device 186 communicatively connected to one local verification device 184.

The independent global verification device 186 receives the physical data from the sensors 140 via the local verification device 184. The local verification device 184 has exactly one communication output or outgoing network link 184c that allows it to communicate information to the independent global verification device 186. The independent global verification device 186 is communicatively connected to other local verification devices 184 and actuators 150 associated with other physical processes 110 and control stages 120 in the utilities system. The independent global verification device 186 is thus configured to obtain state information of the utilities system from all local verification devices 184 for all physical processes 110 across all control stages 120, and may control the physical processes 110 with the actuators 150 to ensure that the dynamics of the physical processes 110 are consistent with the physical data obtained from the sensors 140 as well as the invariants predefined for the physical processes 110. The independent global verification device 186 is communicatively connected to the supervisory devices 160 including the SCADA workstation for corroboration of the physical data and detection of the anomalies in one or more physical processes 110 in the utilities system.

As described in an attack event above, a non-compromised global verification device 182 in one control stage 120 may detect an attack in another control stage 120 with a compromised global verification device 182. However, in rare attack scenarios where all global verification devices 182 across all control stages 120 are compromised, such attacks may not get detected. In such attack scenarios, the controller devices 130 may be compromised and the control actions by the controller devices 130 may not be reliable. For example, when an attacker has assumed control of all controller devices 130, control actions by the controller devices 130 may be potentially compromised and may cause further damage to the utilities system.

The local verification device 184 and independent global verification device 186 are configured for managing such attack scenarios. As they are communicatively isolated from the controller devices 130, an attack on the controller devices 130 is unlikely to compromise them. Moreover, the local verification device 184 and independent global verification device 186 have hardwire direct connections to the sensors 140, and thus are able to collect uncompromised physical data from the sensors 140 for detecting such attacks. The local verification device 184 and independent global verification device 186 are programmed to check the invariants, trigger alerts, and control/regulate the physical processes 110 when an attack is detected.

In one embodiment, there is one local verification device 184 for each control stage 120. However, multiple local verification devices 184 may be used depending on the complexity of the invariants and the code to respond when an attack is detected. In one embodiment, the utilities system is relatively small and there is one independent global verification device 186 which is adequate to obtain local state information from the local verification devices 184 for state estimation. In another embodiment, the utilities system is more complex and/or distributed. Multiple independent global verification devices 186 may be used for state estimation using domain specific distributed state estimation algorithms.

It will be appreciated that in the defense system 300 for each control stage 120, the verification devices 180 may comprise one or more of the global verification device 182, local verification device 184, and independent global verification device 186. In one embodiment, the verification devices 180 comprise all three devices 182, 184, and 186. In another embodiment, the verification devices 180 comprise only one global verification device 182 resident in the controller device 130. In another embodiment, the verification devices 180 comprise only one local verification device 184. In another embodiment, the verification devices 180 comprise only one local verification device 184 and one independent global verification device 186.

Referring to FIG. 3 and FIG. 5, the method 500 comprises a step 540 of detecting, by the verification devices 180, anomalies in the physical process 110 operative in the utilities system. The method 500 further comprises a step 550 of controlling, by the controller device 130 or verification devices 180, the actuators 150 to remedy the anomalies and regulate the physical process 110, thereby defending the utilities system against the cyber-physical attacks associated with the anomalies.

In some embodiments, upon detecting an attack, the controller device 130 triggers an alarm but does not generate any control action/signal or actuation signal to the actuators 150. The controller device 130 is prevented from taking any control action to be executed by the actuators 150 as the global verification device 182 might have been compromised due to a malware in the embedding controller device 130. Upon detecting the attack, the local verification device 184 triggers an alarm and may override control actions by the controller device 130. Two types of alarms may be generated by the local verification devices 184—a physical alarm and a logical alarm. The physical alarm may be a blinking light and/or an audio signal from the alert devices 164. The logical signal is communicated to the HMI 162 via the independent global verification device 186.

Depending on the nature of the attack as detected by the local verification device 184, the control action may be generated by the local verification device 184 or the independent global verification devices 186. Each of the local verification device 184 and independent global verification device 186 is thus configured to assume and take over control of the actuators 150 from the initial control by the controller devices 130 in response to the local verification device 184 detecting the anomalies. More specifically, the local verification device 184 is configured to determine which one of the local verification device 184 and independent global verification device 186 assumes control of the actuators 150.

The local verification device 184 is designed to defend one or more specific components of the utilities system. During an attack, the actuators 150 may be controllable by the local verification device 184 to defend the specific components. For example, if a pump is turned on but there is no water in the input tank, then the pump must be shut off. The local verification device 184 may control the relevant actuators 150 to shut off the pump and communicate this information to the independent global verification device 186. The independent global verification device 186 can then communicate with other local verification devices 184 and other actuators 150 so that they can perform appropriate control actions given that a portion of the physical process 110 (and thus of the collective physical process 115) may be shut down. Alternatively, the independent global verification device 186 may assume control of the actuators 150 to shut off the pump because it needs to know the states of the other control stages 120/physical processes 110 from the other local verification devices 184. Nevertheless, the independent global verification device 186 is useful in ensuring that the dynamics of the collective physical process 115 are consistent with its intended behaviour according to the physical data and the invariants.

The defense system 300 comprises a multiplexer (mux) 152 which is a device that selects one of multiple input signals and forwards a selected input signal into a single line. In the defense system 300 as shown in FIG. 3, the multiplexer 152 receives multiple input signals and communicates a selected input signal to the actuators 150. These input signals may also be referred to as control actions or actuation signals. In normal operation of the physical process 110, the controller device 130 communicates actuation signals to the actuators 150 via the multiplexer 152 in order to control the physical process 110.

However, upon detecting the attack, the local verification device 184/independent global verification device 186 assumes control of the actuators 150 from the controller devices 130. Particularly, each of the local verification device 184 and independent global verification device 186 communicates actuation signals (indicated as A) to the actuators 150 via the multiplexer 152. Similar to the wired communication between the sensors 140 and the local verification device 184, the local verification device 184 and independent global verification device 186 are communicatively connected to the multiplexer 152 via a wired communication.

Depending on the nature of the attack, the local verification device 184 determine which one of the local verification device 184 and independent global verification device 186 assumes control of the actuators 150. The local verification device 184 communicates a control signal (indicated as C) to the multiplexer 152, the control signal instructing the multiplexer 152 which actuation signals to communicate to the actuators 150.

Accordingly, the multiplexer 152 prioritizes the source of the control actions/actuation signals communicated to the actuators 150. The controller device 130 has priority under normal operation of the physical process 110 and control the actuators 150 in accordance with the design of the utilities system. In the event of cyber-physical attacks, the priority shifts to the local verification device 184 that decide whether the control action should come from the local verification device 184 or the independent global verification device 186. The actuators 150 are thus controllable by the controller device 130 or the local verification device 184/independent global verification device 186 depending on the attack (or non-attack/normal) scenarios to remedy the anomalies and regulate the physical processes 110, thereby defending the utilities system against the cyber-physical attacks.

Attack Scenarios

There are various types or scenarios of cyber-physical attacks that may be detected with the defense system 300 with the OD system including the verification devices 180 and ICs 170. Attacks can be classified based on three security objectives of the utilities system—confidentiality, integrity, and availability. A lack of confidentiality results in disclosure when an unauthorized entity gains access to data in the utilities system. A lack of integrity leads to deception when an authorized party receives false data and believes it is true. A lack of availability results in denial of service (DoS) or distributed DoS (DDoS) when an authorized entity cannot receive commands or data. Deception, disclosure, and DoS/DDoS are three types of cyber attacks the utilities system.

Complex attacks on the utilities system may be classified based on three dimensions for the attack space—attacker's a priori system model knowledge, attackers disclosure resources, and attacker's disruption resources. On example of a complex attack is a replay attack, during which an attacker uses disclosure resources to hijack the sensors 140 and record their measurements of physical data for a certain duration, and then uses his disruption resources to repeat the recorded measurements while carrying out his attack. The attacker can attempt to inject false control inputs or carry out physical attacks on the utilities system while replaying the false sensor measurements.

Another example of a complex attack is a false data injection attack, wherein an attacker uses disruption resources and system knowledge to inject false sensor measurements of physical data in order to mislead the controller devices 130. Mathematical system state estimation, failure detection methods, and/or analytical detection techniques can be used to detect such attacks, however it is also feasible for skilled attackers to use system knowledge to successfully bypass detection.

Figure 6:
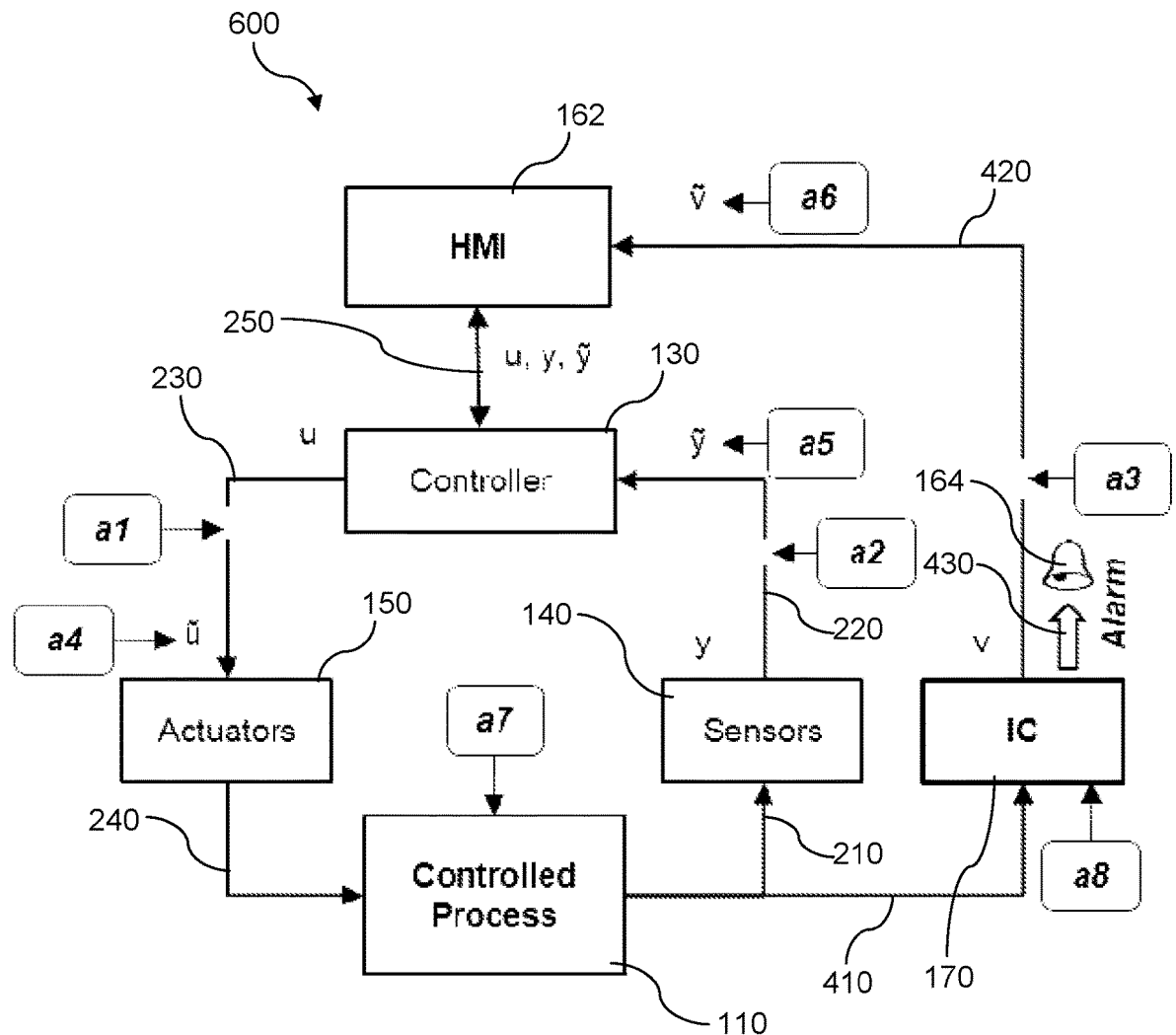
FIG. 6 is an illustration of an attack workflow in a utilities system, in accordance with various embodiments of the present disclosure.

FIG. 6 illustrates a schematic of an attack workflow 600 in a utilities system in the event of a cyber-physical attack. Indicators a1, a2, and a3 represent DoS attacks wherein communication channels are hijacked. The actuators 150 are prevented from receiving control inputs (a1); the controller devices 130 are prevented from receiving physical data from the sensors 140; and/or the HMI 162 is prevented from receiving data from the ICs 170 (a3). Indicator a4 represents a deception attack wherein an attacker (a4) causes false information, e.g. actuation signals, to be communicated from the controller devices 130 to the actuators 150 ($\tilde{u} \neq u$). Indicator a5 represents a deception attack wherein an attacker (a5) causes false information, e.g. physical data, to be communicated from the sensors 140 to the controller devices 130 ($\tilde{y} \neq y$). Indicator a6 represents a deception attack wherein an attacker (a6) causes false information to be communicated from the ICs 170 to the HMI 162 ($\tilde{v} \neq v$). Indicators a7 and a8 represent direct physical attacks on the physical processes 110 (a7) and/or the ICs 170 (a8). The alert devices 164 may be configured to be automatically activated in the event of a physical attack on the ICs 170.

In the example of a replay attack, the attacker sends false sensor measurements $\tilde{y}$ to the controller devices 130 (a5), and injects false control inputs $\tilde{u}$ to the actuators 150 (a4) and/or carries out physical attacks (a7). During a false data injection attack, the sensor measurements are modified (a5) ($\tilde{y} \neq y$).

The ICs 170 in the verification devices 180 of the defense system 300 can be used to detect the following cyber attacks on the cyber subsystem 100 of the utilities system.

Deception attacks on sensor measurements (a5), when false physical data is communicated from the sensors 130 to the controller devices 130 ($\tilde{y} \neq y$). Operators can compare sensor measurements v from the ICs 170 and sensor measurements $\tilde{y}$ from the controller devices 130 ($v \neq \tilde{y}$) to identify inconsistencies.

DoS attacks on sensor measurements (a2), when the attacker prevents the sensor measurements from reaching the controller devices 130. Operators will notice absence of the sensor measurements, but they will be able to estimate the current states of the physical processes 110 based on measurements received from the ICs 170 (v) and communicate the correct inputs to the controller devices 130.

Physical attacks on the physical processes 110 (a7). If the ICs 170 detect violation of the invariants, the ICs 170 trigger the alert devices 164 to notify the operators. Operators will be notified of possible attacks even if the communication channels between the ICs 170 and the control center via the HMI 162 are compromised (a3).

Replay attacks. Operators will notice inconsistencies between the sensor measurements from the controller devices 130 and from the ICs ($v \neq \tilde{y}$). Furthermore, if the attacker attempts to send false control inputs $\tilde{u}$ to the actuators 150 (a4) while replaying pre-recorded data, the ICs 170 will still be able to measure the actual states of the physical processes 110. If the physical processes 110 become critical, the ICs 170 will activate the alert devices 164. The alert devices 164 will also be activated if the attacker performs physical attacks (a7) and the physical processes 110 become critical.

False data injection attacks. Operators will be able to detect such attacks by comparing the sensor measurements from the controller devices 130 against the sensor measurements from the ICs 170 ($v \neq \tilde{y}$).

Accordingly, the verification devices 180 are useful in detecting different types or attacks on the utilities system. Particularly, the verification devices 180 can be used to detect complex attacks, such as replay and false data injection attacks. However, the verification devices 180 are unable to detect all types of attacks, such as disclosure attacks. Therefore, the verification devices 180 should be used in combination with other security mechanisms to better protect the utilities system. More generally, the defense system 300 comprising the traditional defense system and OD system using the verification devices 180 provide the required security level for the utilities system.

Attack Experiment

Figure 7:
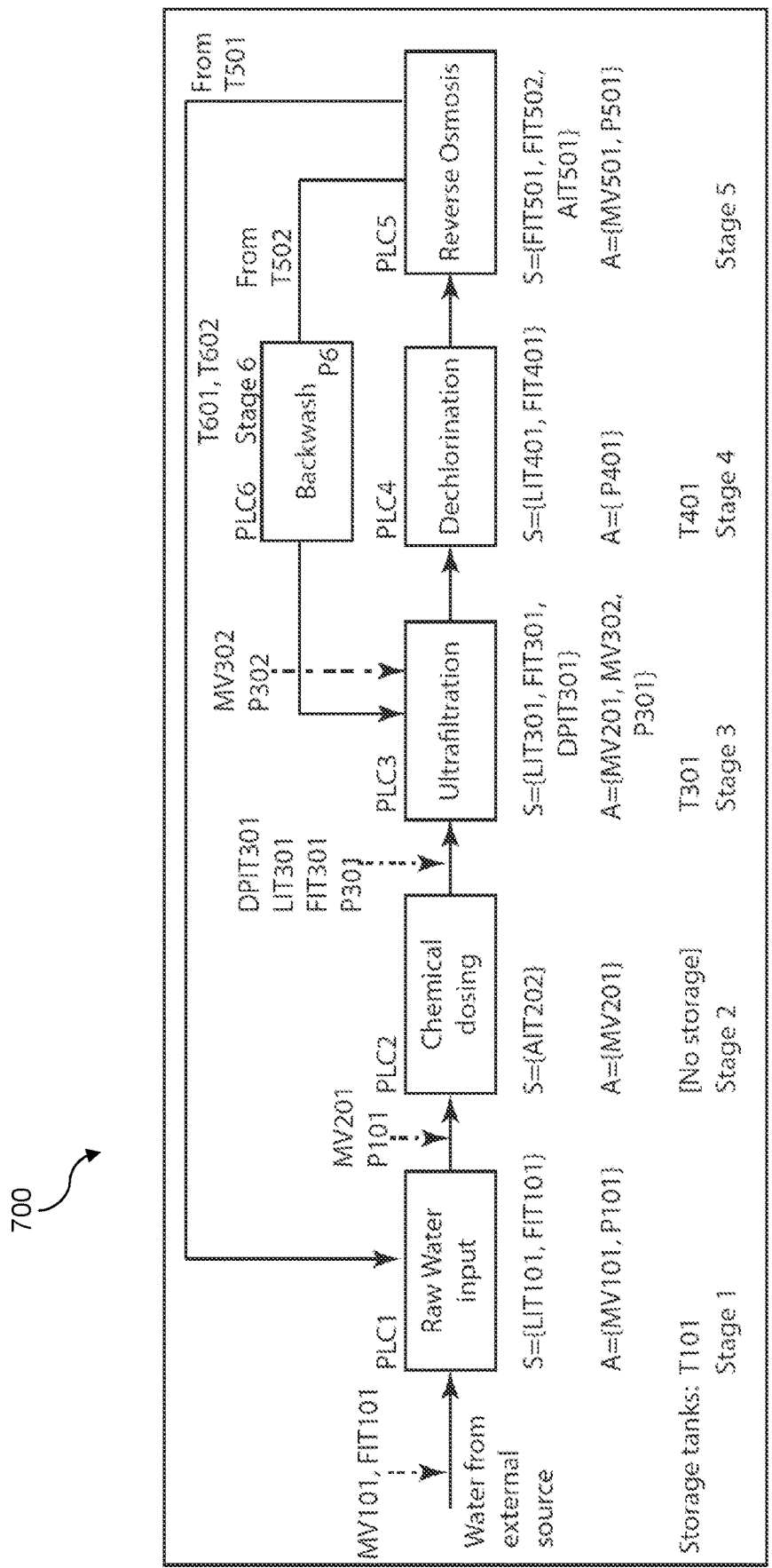
FIG. 7 is an illustration of a block diagram of a utilities system (water treatment plant), in accordance with various embodiments of the present disclosure.

An experiment of a cyber attack on a utilities system was performed to test the defense system 300 and defense method 500. A model of the utilities system was developed as a six-stage water treatment plant. FIG. 7 shows a block diagram 700 of the water treatment plant model with the six control stages 120 (indicated as PLC1 to PLC6) and various components. In FIG. 7, the terms S, A, MV, FIT, LIT, DPIT, AIT, T, and P respectively represent sensors, actuators, motorized valve, flow meter, level meter, differential pressure meter, pH meter, water tank, and pump.

A state model of the water treatment plant was created and the invariants were defined for use in the verification devices 180. The model includes the water level in five tanks and pH values at two points in the water treatment plant. The oxidation/reduction potential (ORP), conductivity, differential pressure across the Ultrafiltration stage PLC4, and dichlorination were excluded from the model. Including water level in tanks and pH values allows detection of attacks aimed at damaging a pump, causing tank overflow, and reducing the production of quality filtered water.

FIG. 8 shows a table 800 of sample model equations that were used to derive the invariants. The last entry in the table 800 is one of the several invariants derived from the model. Additional invariants were derived through an examination of the cause-effect relationship across several components of the water treatment plant. For example, if valve MV101 is open and pump P101 is off, then the water level in tank T101 must increase.

The model of the water treatment plant was created according to one embodiment of the defense system 300, wherein the verification devices 180 comprise only the global verification devices 182 for the different stages PLC1 to PLC6 of the water treatment plant. The attack surface for the water treatment plant and the attack model described below were developed to test the effectiveness of the defense system 300 against a variety of cyber attacks.

An attack surface for a utilities system the set of all of its logical and physical elements. An attack region is a subset of an attack surface. FIG. 9 shows a table 900 of sample attack regions in the utilities system which is a water treatment plant. The element type, element label, and its function in the water treatment plant are listed. A sensor 140 can function as a logical element as it provides data to a controller device 130, as well as a physical element that could be damaged or replaced by an attacker. Whether to consider an element as logical and/or physical depends on the element itself as well as on the nature of attacks against which a defense mechanism of the element was designed. Thus, a controller device 130 is a physical element but also a logical element due to the control logic it stores and executes.

A utilities system-centric attacker model is used to assess the effectiveness of the defense system 300. Such a model was designed specifically for investigating the impact of cyber-physical attacks on the water treatment plant. In this model, the water treatment plant was considered as an attacker's domain and modelled as a triple (E, Pr, Pe), where E is a finite set of elements in the utilities system (i.e. the attack surface). Pr is a finite set of properties of the physical processes 110, including properties such as the pH values and conductivity of water at a specific point in the water treatment plant. Pe is a finite set of performance metrics, such as the amount of water produced per unit time, e.g. in gallons/minute.

An attacker model is a pair (I, D), where I is a set of attacker intents and D a collection of subsets of the three sets in the domain (E, Pr, Pe). For example, I may refer to "Overflow a Tank" and the domain may be ([LIT101, MV101], [ ], [ ]). Here, the attacker is not interested in changing any property of water or performance metrics of the water treatment plant. Hence, the subsets corresponding to Pr and Pe are empty.

The following types of attacks are considered.

Single Stage Single Element (SSSE) attack that focuses on exactly one element which is either a logical element or a physical element.

Single Stage Multiple Element (SSME) attack that focuses on a plurality of elements at any stage 120.

Multiple Stage Single Element (MSSE) attack that is similar to an SSSE attack except that it is performed on multiple stages 120.

Multiple Stage Multiple Element (MSME) attack that is similar to an SSME attack except that it is performed on multiple stages 120.

Two detection mechanisms were developed. For detecting SSSE attacks, the invariant uses data from sensors 140 at the stage 120 where the attacked components reside. For detecting SSME attacks, the invariant uses readings and physical data from sensors 140 in its immediate neighbouring stages 120, i.e. preceding and/or succeeding stages 120. For example, a deception attack using the level sensor LIT101 is detected using the sensor readings from stage PLC1. However, a deception attack that compromises all sensors 140 at stage PLC1 cannot be detected using sensor readings and physical data from the same stage PLC1. In this case, the detection mechanism embedded as a global verification device 182 in the neighbouring stage PLC2 is able to detect the attack. Such detection becomes possible due to the process interactions across different stages PLC1 to PLC6 in the water treatment plant.

A total of twelve SSSE attacks were designed and launched. In addition, six attack scenarios were created for SSME attacks, with one SSME attack corresponding to each attack scenario launched. The SSSE attacks were simple and altered readings of various sensors 140 in various stages PLC1 to PLC6 of the water treatment plant. The SSME attacks were strategic and aimed at deceiving the controller devices 130 by capturing the actuators 150 and communicating simulated false readings to the controller devices 130 to make the controller devices 130 believe what the attacker intends. All attacks were launched across the stages PLC1, PLC3, PLC4, and PLC5 of the water treatment plant.

The experiment was conducted in two phases. In the first phase, attacks were launched without the defense system 300 to understand the responses of the water treatment plant. The first phase also serves as a reference basis for comparison with the second phase. In the second phase, the defense system 300 with the global verification devices 182 was implemented in the water treatment plant. The attacks were launched again to assess the effectiveness of the defense system 300.

The experiment results showed that all SSSE and SSME attacks were detected by the defense system 300 including the global verification devices 182 resident in the controller devices 130. The invariants derived from the design of each stage PLC1 to PLC6 of the water treatment plant are effective in detecting SSME attacks. A distributed attack detection mechanism was used to detect the SSME attacks. The logic of this detection mechanism was embedded in the global verification devices 182 that communicated with the global verification devices 182 in the neighbouring controller devices 130 to obtain physical data from the sensors of the neighbouring stages.

While replay attacks on the stage PLC1 were not initially detected as the stage PLC1 only has a succeeding stage PLC2 and no preceding stage, the invariants for the stage PLC1 were redefined and the modified global verification device 182 for the stage PLC 1 was later successful in detecting the replay attacks.

Implementation

The defense system 300 described in various embodiments herein is designed to defend a utilities system, such as a water treatment plant or power generation plant, from cyber-physical attacks such as in situations where the communications network and/or the control logic inside the controller devices 130, e.g. PLCs, are compromised. The defense system 300 uses an orthogonal defense that is separate/independent from, as well as is auxiliary to and complements, the traditional defense system.

The defense system 300 comprises verification devices 180 and ICs 170 that are able to detect cyber attacks based on the use of invariants derived from process dynamics and interactions among components across the various control stages 120 and physical processes 110 operative in the utilities system. The architecture of the defense system 300 is layered, such that every control stage 120 of the utilities system comprises one or more verification devices 180 for monitoring the physical processes 110 controlled in the control stages 120. The verification devices 180 cooperate with the controller devices 130, sensors 140, and actuators 150 to understand industrial protocols for monitoring and controlling the physical processes 110.

The verification devices 180 in the utilities system may comprise multiple local verification devices 184 and one independent global verification device 186. The local verification devices 184 communicate physical data from the sensors 140 and other state-related information of the respective control stages 120 and for the respective physical processes 110 to the independent global verification device 186, which is a centrally distributed device in the utilities system. The independent global verification device 186 also obtains component state information from other sources, such as the controller devices 130 (e.g. PLCs) and supervisory devices 160 (e.g. SCADA workstation, Historian, and OPC server). The information about the same components obtained from multiple sources is not redundant. Each component state information source can be compromised by a smart attacker, and in the extreme case, by an insider working in the utilities system. By corroborating the information from multiple potential attack points, it is possible for the defense system 300 to detect a cyber attack, trigger alarms, and pinpoint the source and domain of the attack in the utilities system.

The design of the defense system 300 is not influenced by any specific attacker model or attack model. The defense system 300 is attack-agnostic in its defense mechanism, in that, the corroboration of component state information is focused on the state-correctness of the utilities system, and not on the attacker's approach. The defense system 300 is thus able to detect unique and undocumented attacks, also known as zero day attacks, when they involve modification of component values at some level of the utilities system that cause deviation of dynamics of the physical processes 110 from the expected behaviour.

The defense system 300 may be implemented in a utilities system that is still in the design stage or one that is already operational in an existing plant or facility. In the former approach, the defense system 300 can be designed such that the traditional defense system of the utilities system is integrated with the orthogonal defense using the verification devices 180 and ICs 170. During the design phase, the hardware and software portions of the defense system 300 can be incorporated. Implementing the defense system 300 at the design phase minimizes the risk of malfunction or even failure during operation of the utilities system.

In the latter approach, the defense system 300 may be implemented when the plant is under maintenance instead of during normal operation when the physical processes 110 are already being monitored and controlled. In some utilities system, the controller devices 130 may utilize dual PLCs. One of these PLCs is the primary PLC while the other (secondary PLC) functions as a hot backup to assume or take over control when the primary PLC malfunctions or fails. The defense system 300 may be implemented in the secondary PLC of one controller device 130 in one control stage 120. Particularly, a global verification device 182 may be implemented in the secondary PLC. Operation of the global verification device 182 may be tested by switching it to function as the primary PLC instead. Implementation of the defense system 300 may be extended to the other control stages 120 of the utilities system upon successful testing.

In the foregoing detailed description, embodiments of the present disclosure in relation to a defense system and method against cyber-physical attacks are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A defense system for defending a utilities system against cyber-physical attacks associated with anomalies in a physical process operative in the utilities system, the defense system comprising:
   a set of sensors configured for collecting physical data associated with the physical process;
   a set of controller devices configured for receiving the physical data from the sensors and for monitoring process states of the physical process based on the physical data;
   a set of verification devices configured for receiving the physical data from the sensors independently of the controller devices and for monitoring the physical process based on the physical data, said monitoring comprising detecting one or more anomalies in the physical process based on the physical data and a set of invariants predefined for the physical process; and
   a set of actuators selectably controllable by the controller devices or verification devices to remedy the anomalies and regulate the physical process, thereby defending the utilities system against the cyber-physical attacks.

2. The system according to claim 1, wherein the verification devices comprise a number of global verification devices programmatically integrated with the controller devices, the global verification devices configured for receiving the physical data from the sensors and for detecting the anomalies based on the physical data and the invariants.

3. The system according to claim 2, wherein the verification devices comprise a number of local verification devices communicatively isolated from the controller devices, the local verification devices configured for receiving the physical data from the sensors and for detecting the anomalies based on the physical data and the invariants.

4. The system according to claim 3, wherein the verification devices comprise a number of independent global verification devices communicatively connected to the local verification devices and communicatively isolated from the controller devices, the independent global verification devices configured for receiving the physical data from the sensors via the local verification devices and for detecting the anomalies based on the physical data and the invariants.

5. The system according to claim 4, wherein the independent global verification devices are communicatively connected to local verification devices associated with other physical processes operative in the utilities system, the independent global verification devices configured for monitoring all the physical processes operative in the utilities system.

6. The system according to claim 4, wherein each of the local verification devices and independent global verification devices is configured to assume control of the actuators in response to the local verification devices detecting the anomalies.

7. The system according to claim 6, wherein the local verification devices are configured to determine which one of the local verification devices and independent global verification devices assumes control of the actuators.

8. The system according to claim 4, wherein the independent global verification devices are communicatively connected to actuators associated with other physical processes operative in the utilities system.

9. The system according to claim 3, wherein each local verification device comprises only one communication input that is a wired communication for receiving the physical data from the sensors.

10. The system according to claim 1, wherein one or more anomalies in the physical process are detectable based on comparison between the physical data received by the controller devices and the physical data received by the verification devices.

11. The system according to claim 10, wherein:
the controller devices are configured for communicating the physical data to a set of supervisory devices;
the verification devices are configured for communicating the physical data to the supervisory devices bypassing the controller devices; and
wherein the one or more anomalies in the physical process are detectable based on comparison of the physical data by the supervisory devices.

12. A defense method for defending a utilities system against cyber-physical attacks associated with anomalies in a physical process operative in the utilities system, the defense method comprising:
collecting, by a set of sensors, physical data associated with the physical process;
receiving, by a set of controller devices, the physical data from the sensors;
monitoring, by the controller devices, process states of the physical process based on the physical data;
receiving, by a set of verification devices, the physical data from the sensors independently of the controller devices;
monitoring, by the verification devices, the physical process based on the physical data;
detecting, by the verification devices, one or more anomalies in the physical process based on the physical data and a set of invariants predefined for the physical process; and
selectably controlling, by the controller devices or verification devices, a set of actuators to remedy the anomalies and regulate the physical process, thereby defending the utilities system against the cyber-physical attacks.

13. The method according to claim 12, wherein the verification devices comprise a number of global verification devices programmatically integrated with the controller devices, the method comprising receiving, by the global verification devices, the physical data from the sensors and detecting the anomalies based on the physical data and the invariants.

14. The method according to claim 13, wherein the verification devices comprise a number of local verification devices communicatively isolated from the controller devices, the method comprising receiving, by the local verification devices, the physical data from the sensors and detecting the anomalies based on the physical data and the invariants.

15. The method according to claim 14, wherein the verification devices comprise a number of independent global verification devices communicatively connected to the local verification devices and communicatively isolated from the controller devices, the method comprising receiving, by the independent global verification devices, the physical data from the sensors via the local verification devices and detecting the anomalies based on the physical data and the invariants.

16. The method according to claim 15, further comprising assuming, by one of the local verification devices and independent global verification devices, control of the actuators in response to the local verification devices detecting the anomalies.

17. The method according to claim 16, further comprising determining, by the local verification devices, which one of the local verification devices and independent global verification devices assumes control of the actuators.

18. The method according to claim 14, further comprising communicating the physical data from the sensors to the local verification devices via a wired communication.

19. The method according to claim 12, comprising:
comparing the physical data received by the controller devices and the physical data received by the verification devices; and
detecting one or more anomalies in the physical process based on said comparison of the physical data.

20. The method according to claim 19, comprising:
communicating the physical data from the controller devices to a set of supervisory devices;
communicating the physical data from the verification devices to the supervisory devices bypassing the controller devices;
comparing, by the supervisory devices, the physical data received from the controller devices and the physical data received from the verification devices; and
detecting one or more anomalies in the physical process based on said comparison of the physical data by the supervisory devices.

* * * * *